Oct. 3, 1939.   H. C. BOWEN ET AL   2,174,615
FLUID PRESSURE BRAKING SYSTEM
Filed Dec. 28, 1935   2 Sheets-Sheet 1
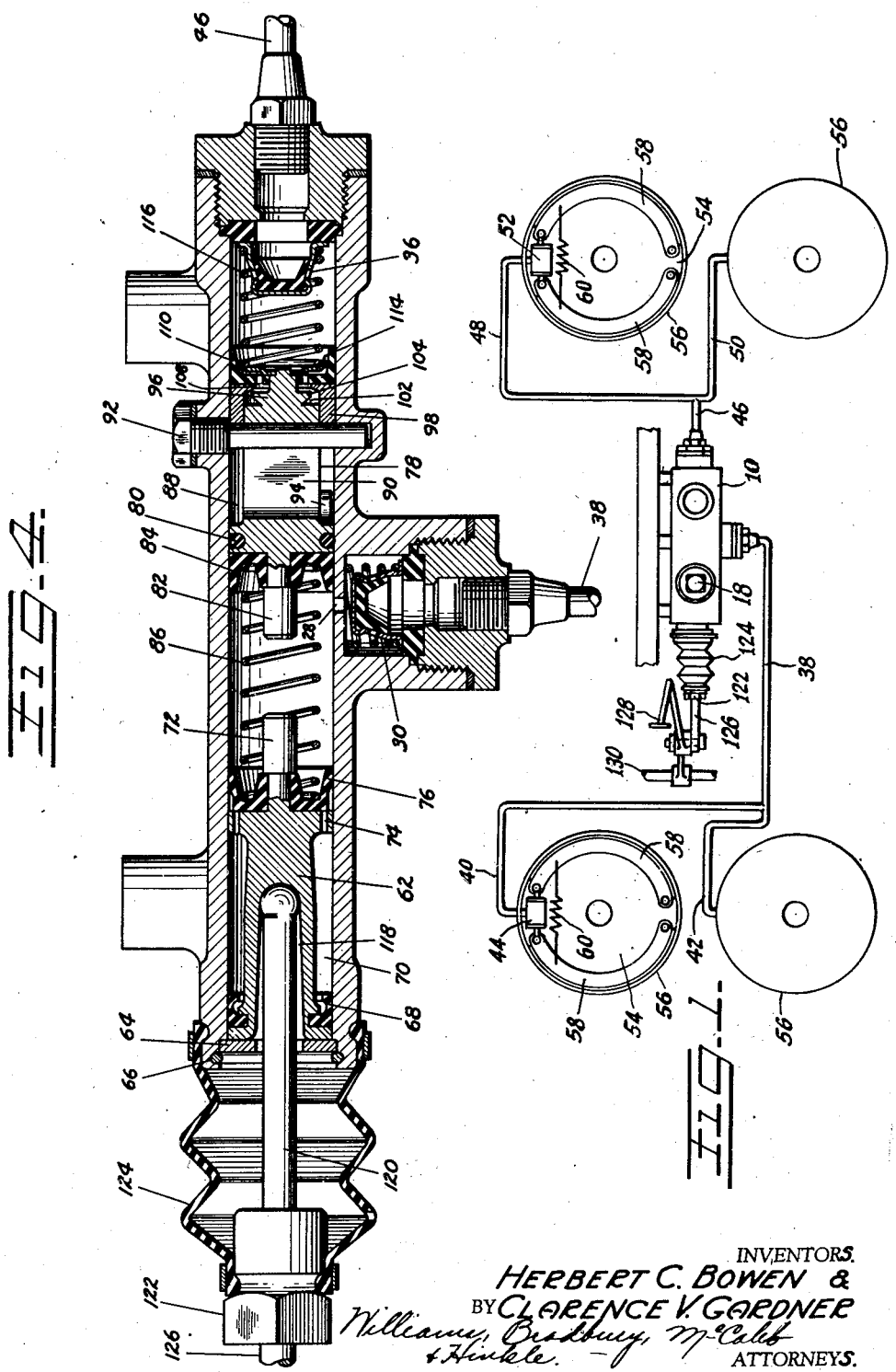
INVENTORS.
HERBERT C. BOWEN &
BY CLARENCE V. GARDNER
ATTORNEYS.

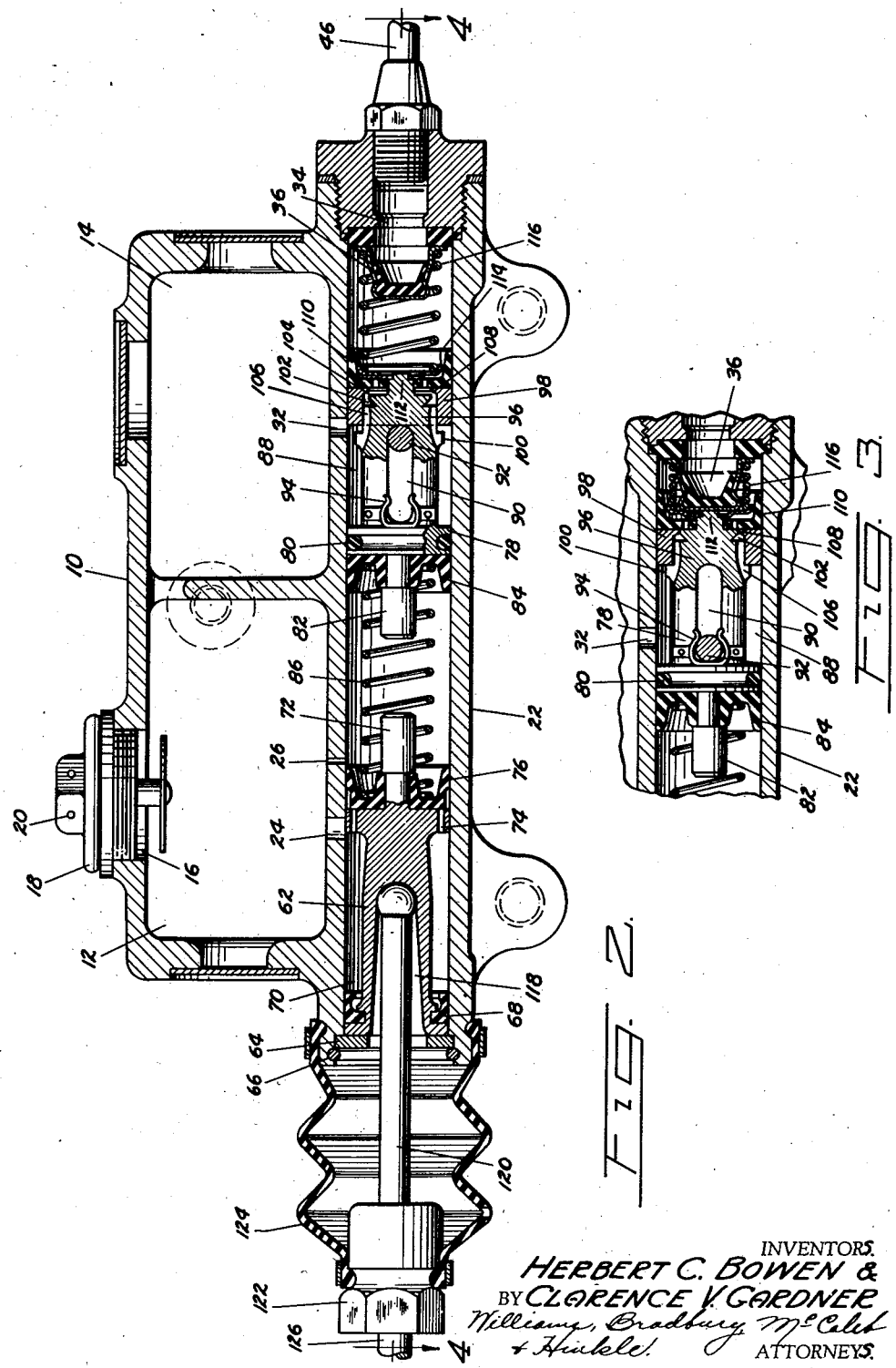

Patented Oct. 3, 1939

2,174,615

UNITED STATES PATENT OFFICE 2,174,615

FLUID PRESSURE BRAKING SYSTEM

Herbert C. Bowen and Clarence V. Gardner, Detroit, Mich., assignors to Hydraulic Brake Company, Detroit, Mich., a corporation of California Application December 28, 1935, Serial No. 56,512

4 Claims. (Cl. 60—54.6)

This invention relates to fluid pressure braking systems and more particularly to a duplex braking system.

Broadly the invention comprehends a duplex fluid pressure braking system for a motor vehicle, one for actuating the brakes associated with the front wheels of the vehicle and the other for actuating the brakes associated with the rear wheels of the vehicle.

An object of the invention is to provide a duplex fluid pressure braking system having a single operating means.

Another object of the invention is to provide a duplex fluid pressure braking system having means for equalizing varying pressures which may be produced in the system.

A further object of the invention is to provide a fluid pressure braking system including a fluid pressure producing device constructed and operative to actuate two separate systems to equalize pressures in the systems, and to maintain at least one of the systems effective in the event of failure of the other system due to leakage or breakage.

Other objects of the invention will appear from the following description taken in connection with the accompanying drawings which form a part of this specification, and in which,—

Fig. 1 is a schematic view of a fluid pressure braking system embodying the invention;

Fig. 2 is a vertical sectional view of a duplex fluid pressure producing device connected in the system;

Fig. 3 is a fragmentary view in section illustrating one of the pistons of the fluid pressure producing device at the end of its compression stroke; and Fig. 4 is a longitudinal sectional view substantially on line 4—4, Fig. 2.

Referring to the drawings for more specific details of the invention, 10 represents a reservoir having two compartments 12 and 14 and a filling opening 16 which may be closed as by a plug 18 having openings 20 for venting the reservoir to the atmosphere.

A cylinder 22 formed at the bottom of the reservoir has ports 24 and 26, providing communications between the cylinder and the compartment 12 of the reservoir, and a centralized discharge port 28 controlled by a two-way valve 30. The cylinder also has a port 32, providing a communication between the cylinder and the compartment 14 of the reservoir, and a discharge port 34 controlled as by a two-way valve 36.

A fluid pressure delivery pipe or conduit 38 connected to the valve 30 has branches 40 and 42 connected respectively to fluid pressure actuated motors 44 arranged for the actuation of friction elements of the brakes; and, correspondingly, a fluid pressure delivery pipe or conduit 46 connected to the valve 36 has branches 48 and 50 connected respectively to fluid pressure actuated motors 52 arranged for the actuation of the friction elements of the brakes.

The fluid pressure actuated motors 44 and 52 are arranged in pairs, one pair for actuating the brakes associated with the front wheels of the vehicle and the other pair for actuating the brakes associated with the rear wheels of the vehicle.

The brakes may be of conventional type, including a backing plate 54, a rotatable drum 56 associated therewith, corresponding interchangeable friction elements or shoes 58 pivoted on the backing plate, and a motor corresponding to the motors 44 and 52 arranged on the backing plate between the shoes and operative to spread the shoes into engagement with the drum 56 against the resistance of a retractile spring 60 connecting the shoes.

A piston 62 reciprocable in the cylinder 22 is retained against displacement by a washer 64 seated on an annular shoulder in the open end of the cylinder and secured in place by a retaining ring 66 seated in a circumferential groove in the wall of the cylinder. The skirt of the piston has a circumferential groove in which is fitted a leak-proof washer 68 to provide against seepage of fluid from the cylinder past the piston. The body of the piston is reduced in cross-section to provide in conjunction with the wall of the cylinder an annular chamber 70 communicating by way of the port 24 with the compartment 12 of the reservoir. The head of the piston has a forwardly extending concentric pin 72 and a plurality of spaced ports 74 providing communications between the annular chamber 70 and that portion of the cylinder forward of the head of the piston, and a collapsible leak-proof cup 76 seated on the head of the piston and embracing the pin 72 controls the ports 74.

A dependent piston 78, reciprocable in the cylinder forward of the discharge port 28, has a circumferential groove in which is fitted a leak-proof washer 80 providing against seepage of fluid past the piston. The head of this piston, opposed to the head of the piston 62, has a forwardly extending concentric pin 82 and a leak-proof cup 84 seated on the head embraces the pin, and a spring 86 interposed between the cup 84 and the cup 76 on the piston 72 serves to retain the cups against displacement and also to assist in returning the piston 62 to its retracted position.

The body of the piston 78 is reduced in cross-section to provide in conjunction with the wall of the cylinder 22 an annular chamber 88 communicating by way of the port 32 with the compartment 14 of the reservoir. This reduced body portion has an elongated diametrical slot 90. A pin 92 secured in the wall of the cylinder extends through the slot to limit the movement of the piston, and a clip 94 secured on the piston adjacent the slot receives the pin when the piston is at the end of its compression stroke.

The head of the piston 78 comprises two parts, a fixed head 96 and a shell 98 movable relative thereto. The fixed head has an annular shoulder 100 on which the shell seats when the piston is on its compression stroke, a groove 102 providing a lip 104, and a plurality of longitudinal slots 106 providing communications between the groove 102 and the annular chamber 88. The shell 98 has an annular lip 108 adapted to register with the lip 104 on the fixed head during the compression stroke of the piston so as to present an unbroken seat for a leak-proof cup 110. This cup is slidably mounted on a concentric extension 112 on the piston, and the cup has a plurality of spaced apertures providing for the free passage of fluid between the annular chamber 88 and that portion of the cylinder forward of the piston during the retraction stroke of the piston and when the piston is in its retracted position. A spring seat 114 suitably secured to the free end of the projection 112 retains the cup 110 against displacement, and a spring 116 interposed between the spring seat 114 and the two-way valve 36 retains the valve against displacement and also serves to return the piston 78 to its retracted position.

The piston 62 has a recess 118 in its back for the reception of one end of a thrust pin 120 on the other end of which is a coupling 122 connected as by a flexible boot 124 to the open end of the cylinder for the exclusion of dust and other foreign substances. A rod 126 connects the coupling to a foot pedal lever 128 pivoted on a suitable support 130, and a conventional retractile spring, not shown, connects the pedal to a fixed support, also not shown.

In normal operation, when the operator depresses the foot pedal lever 128 to apply the brakes, force is transmitted from this lever through the rod 126 and thrust pin 120 to the piston 62, resulting in moving the piston on its compression stroke. During the initial movement of the piston on its compression stroke the collapsible leak-proof cup 76 on the head thereof closes the port 26 and pressure is imposed on the fluid in the cylinder 22 forward of the piston resulting in discharge of fluid from the cylinder through the port 28, past the two-way valve 30 and through the fluid pressure delivery pipe 38 into the motors 44, causing energization of the motors with the resultant spreading of the shoes 58 into engagement with the drums 56 against the resistance of the retractile springs 60.

Concomitant with this operation, the fluid under pressure in the cylinder forward of the piston 62 imposes pressure on the piston 78 resulting in movement of this piston on its compression stroke. During the initial movement of the piston 78 on its compression stroke, the shell 98 seats on the shoulder 100 and closes the passages 102 and 106 through the head of the piston; and as the piston advances on its compression stroke pressure is imposed on the fluid in the cylinder forward of the piston 78 resulting in discharge of fluid therefrom past the two-way valve 36 and through the discharge port 34 and fluid pressure delivery pipe 46 into the fluid pressure actuated motors 52, causing actuation of the motors with the resultant spreading of the shoes 58 into engagement with the drums 56 against the resistance of the retractile springs 60.

Because of the shiftability of the piston 78, due to variations of pressures which may be produced in the separate systems, and because of a differential in adjustment of the brakes associated with the front wheels of the vehicle and the brakes associated with the rear wheels of the vehicle, in normal operations of the brakes the movement of the piston 78 is such as to equalize pressures in the separate systems to the end that the brakes associated with the front and rear wheels of the vehicle may be applied with equal force and effect.

Upon release of the applied force on the foot pedal lever 128, this lever returns to its normal or retracted position under the influence of a retractile spring. As the foot pedal lever returns to its normal position, the rod 126 and the thrust pin 120 are retracted, resulting in release of the piston 62, whereupon the piston 62 moves to its retracted position under the influence of the spring 86 assisted by the return of the piston 78 to its retracted position under the influence of the spring 116.

As the piston 62 moves to its retracted position a partial vacuum is created in the cylinder 22 forward of the piston 62 resulting in drawing fluid from the compartment 12 of the reservoir through the port 24 into the annular chamber 70, thence through the ports 74 in the head of the piston past the collapsible leak-proof cup 76 into that portion of the cylinder forward of the piston 62. During this period fluid is returning to the cylinder from the motors 44 under the influence of the retractile springs connected between the friction elements of the brakes.

As the piston 78 returns to its retracted position the shell 98 engages the pin 92, and as the piston 78 recedes communication between the annular chamber 88 and that portion of the cylinder 22 forward of the piston 78 is established so that fluid may flow freely from the compartment 14 of the reservoir into the cylinder, during which time fluid is returning to that portion of the cylinder forward of the piston 78 from the motors 52 under the influence of the retractile springs 60, and any fluid in excess of the quantity required to completely fill the cylinder is returned to the reservoir.

Under abnormal operations of the brakes, as for example, should the brakes associated with the front wheels of the vehicle become inoperative due to leakage or breakage of the fluid pressure delivery pipe or conduit 46 and its branches or the motors 52 connected to the branches, the piston 62 would, on a subsequent operation, travel substantially one-half of its stroke before displacing fluid from that portion of the cylinder forward of the piston 62, through the port 28, past the two-way valve 30, and through fluid pressure delivery pipes 38 into the motors 44, to cause actuation of the motors with the resultant spreading of the shoes 58 into engagement with the drums against the resistance of the retractile springs 60. During this operation the pressure on the fluid in the cylinder forward of the piston 62 actuates the piston 78 to a position where the clip 94 engages the pin 92 to retain the piston 78 against movement. Upon subsequent operations there would be no loss of pedal travel because the piston 78 would remain fixed or stationary and that portion of the cylinder 22 between the pistons 62 and 78 would be completely filled with fluid from the reservoir upon the first retraction stroke of the piston 62 after the rupture.

As another example, should the fluid pressure delivery pipe 38 and/or its branches, or the motors 44 connected to the branches, become fractured to such an extent as to render the brakes associated with the rear wheels of the vehicle inoperative, the piston 62 would, after moving substantially one-half of its stroke, advance the pin 72 on its head into engagement with the pin 82 on the piston 78, and further movement of the piston 62 would move the piston 78 on its compression stroke resulting in actuation of the brakes associated with the front wheels of the vehicle in the manner hereinbefore described.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A fluid pressure producing device comprising a cylinder, a piston reciprocable therein, means for operating said piston, a floating piston reciprocable in the cylinder, said floating piston having a slot therein, a pin rigid with said cylinder and extending into said slot to limit movement of said piston in both directons, and means carried by said floating piston and engageable with said pin to lock said piston in one position.

2. A fluid pressure producing device comprising a cylinder, a piston reciprocable therein, said piston having a slot, a pin rigid with said cylinder and extending into said slot to limit movement of said piston in both directions, and means carried by said piston for engaging said pin to lock said piston in one position.

3. A fluid pressure producing device comprising a cylinder, a piston reciprocable therein, said piston comprising relatively movable parts, said parts in one position providing a passage through said piston and in another position closing said passage, and a pin carried by said cylinder for limiting separating movement of said parts.

4. A fluid pressure producing device comprising a cylinder, a piston reciprocable therein, said piston having a slot therein and comprising relatively movable parts, said parts in one position providing a passage through said piston and in another position closing said passage, and a pin carried by said cylinder for limiting movement of said piston and relative movement between said parts.

HERBERT C. BOWEN.
CLARENCE V. GARDNER.